US010667184B2

(12) United States Patent
Rothery, III et al.

(10) Patent No.: US 10,667,184 B2
(45) Date of Patent: May 26, 2020

(54) SELECTION OF A WIRELESS NETWORK FOR USE BY A TARGET COMPUTING DEVICE (71) Applicant: Hewlett-Packard Development Company, L.P., Houston, TX (US)

(72) Inventors: Joseph Rothery, III, San Diego, CA (US); Laurel Lasslo, San Diego, CA (US); Gregory P. Kuziej, San Diego, CA (US)

(73) Assignee: Hewlett-Parckard Development Company, L.P., Spring, TX (US)

( * ) Notice: Subject to any disclaimer, the term of this patent is extended or adjusted under 35 U.S.C. 154(b) by 1196 days.

(21) Appl. No.: 14/604,170

(22) Filed: Jan. 23, 2015

(65) Prior Publication Data
US 2016/0219469 A1 Jul. 28, 2016

(51) Int. Cl.
*H04W 36/00* (2009.01)
*H04W 84/12* (2009.01)

(52) U.S. Cl.
CPC ........ *H04W 36/0077* (2013.01); *H04W 84/12* (2013.01)

(58) Field of Classification Search
CPC .. H04W 36/00; H04W 36/0077; H04W 84/12
USPC ........................................ 370/252, 331, 338
See application file for complete search history.

(56) References Cited

U.S. PATENT DOCUMENTS

| 7,583,684 | B2 | 9/2009 | Cheng |
| 7,610,057 | B2 | 10/2009 | Bahl et al. |
| 8,495,236 | B1 | 7/2013 | Glasser |
| 8,554,830 | B2 | 10/2013 | Wynn et al. |
| 8,650,311 | B2 | 2/2014 | Dattagupta et al. |
| 8,743,778 | B2 | 6/2014 | Gordon et al. |
| 8,848,915 | B2 | 9/2014 | Park et al. |
| 8,855,065 | B2 | 10/2014 | Welch et al. |
| 2006/0286977 | A1* | 12/2006 | Khandelwal ........ H04L 63/0442 455/432.1 |
| 2007/0066306 | A1* | 3/2007 | Cheng ..................... H04L 63/06 455/445 |
| 2008/0248747 | A1 | 10/2008 | Buckley |

(Continued)

FOREIGN PATENT DOCUMENTS

WO WO-2014189752 A1 11/2014

OTHER PUBLICATIONS

Aruba Networks, "How is the BSSID derived from the Access Point ethernet MAC address?," available Jan. 22, 2015, <https://arubanetworkskb.secure.force.com/pkb/articles/FAQ/How-is-the-BSSID-derived-from-the-Access-Point-ethernet-MAC-address>.

(Continued)

*Primary Examiner* — Mark H Rinehart
*Assistant Examiner* — Natali Pascual Peguero
(74) *Attorney, Agent, or Firm* — HP Inc. Patent Department (57) ABSTRACT Examples disclosed herein relate to selection of a wireless network for use by a target computing device. Examples include a determination that a client computing device is connected to a first wireless network of a first frequency band and having a first service set identifier (SSID). Examples further include selection of a second wireless network of a second frequency band for use by the target computing device without user intervention, the second wireless network having an SSID including at least a base substring of the first SSID.

8 Claims, 3 Drawing Sheets

(56) References Cited

U.S. PATENT DOCUMENTS

| | | | | |
|---|---|---|---|---|
| 2010/0274867 | A1* | 10/2010 | Sawada | H04W 48/08 709/208 |
| 2013/0067094 | A1* | 3/2013 | Madhusudan | H04W 76/023 709/227 |
| 2013/0081121 | A1* | 3/2013 | Green | H04L 9/0827 726/7 |
| 2014/0250513 | A1 | 9/2014 | Cao et al. | |
| 2014/0351444 | A1* | 11/2014 | Qi | H04L 67/16 709/227 |
| 2015/0207578 | A1* | 7/2015 | Ramamurthy | H04W 72/0453 370/338 |

OTHER PUBLICATIONS

Hewlett-Packard Co., "HP Auto Wireless Connect," HP ENVY 8000 series, Jun. 2011.

Hewlett-Packard Development Company, L.P., "Connecting your Wireless Printer," Jan. 14, 2015, Wireless printing center (web page), <http://www8.hp.com/us/en/campaigns/wireless-printing-center/printer-setup-help.html>.

Nathan et al., "Request for Network Credential," International Patent Application PCT/US2014/052190, filed Aug. 21, 2014.

Wikipedia, "IEEE 802.11," Jan. 2, 2015, <http://en.wikipedia.org/wiki/IEEE_802.11>.

Wikipedia, "Service set (802.11 network)," Nov. 21, 2014, <http://en.wikipedia.org/wiki/Service_set_(802.11_network)>.

Xu, S. et al., "Selecting a Preferable Access Point with More Available Bandwidth," (Research Paper), Jun. 9-13, 2013, Published in Communications (ICC), 2013 IEEE International Conference on, pp. 6311-6316, available at http://ieeexplore.ieee.org/xpl/articleDetails.jsp?tp&arnumber=6655618&matchBoolean%3Dtrue%26pageNumber%3D2%26searchField%3DSearch_All_Text%26queryText%3D%28.LB.SSID.RB.%29.

* cited by examiner

SELECTION OF A WIRELESS NETWORK FOR USE BY A TARGET COMPUTING DEVICE

BACKGROUND

A computing device may connect to a wireless network in order to communicate with other device(s) or resource(s). In some examples, a computing device may utilize various credential(s) to connect to the wireless network, such as, for example, a service set identifier (SSID), a password, a security type, and the like.

BRIEF DESCRIPTION OF THE DRAWINGS

The following detailed description references the drawings, wherein.

DETAILED DESCRIPTION

A printing device, such as a printer, multifunction printer (MFP), three-dimensional printer, or the like, may be utilized to print content on a physical medium such as paper or use a printing process to produce a physical object. The printing device may receive an electronic representation of the content from a computing device, such as a desktop or laptop computer, a mobile device, etc. In some examples, the computing device may include a print driver to render the content into a print-ready format that the printing device is able to print and to provide the rendered content to the printing device. A printing device may be a web-enabled printing device that includes at least one network interface controller (NIC) to enable the printing device to connect to a computer network. In some examples, a web-enabled printing device may include a wireless network interface controller (WNIC) to connect to and utilize wireless networks. However, it may be difficult for a printer user to manually configure a web-enabled printing device to connect to a wireless network that is in range for the printing device.

Additionally, many web-enabled printing devices are able to connect to wireless networks that operate in the 2.4 GHz frequency band, while not being able to connect to wireless networks that operate in the 5 GHz frequency band. As such, the growing use of 5 GHz wireless networks may add additional difficulty for a user wishing to connect a web-enabled printing device to a network. Such difficulties may be frustrating to users, and may lead to customer service calls.

In some examples, a computer application may be provided to acquire appropriate network credentials and provide them to a printing device for use in connecting the printing device to the appropriate wireless network. However, when a computing device is connected to a wireless network of the 5 GHz frequency band to which the printing device cannot connect, the computing device cannot instruct the printing device to connect to the network to which it is currently connected.

To address these issues, in examples described herein, a client computing device connected to a wireless network of a first frequency band (e.g., 5 GHz), to which a target computing device (e.g., a printing device) cannot connect, may select another wireless network of a second frequency band (e.g., 2.4 GHz) for use by the target computing device. In many examples, 2.4 GHz and 5 GHz wireless network may both be in range in the same location. For example, many wireless routers (e.g., wireless access points (WAPs)) may provide both 2.4 GHz and 5 GHz wireless networks (which may be bridged, pass through enabled, or the like). In such examples, identifiers associated with those networks, such as the service set identifiers (SSIDs) of those networks, may be related. For example, standard setup procedures for such wireless routers may utilize the same SSID (e.g., "MYHOME", etc.) for both the 2.4 GHz and 5 GHz networks. In other examples, the standard setup procedures may utilize SSIDs sharing the same base substring. For example, the SSID for the 5 GHz network may be "MYHOME_5 G" while the SSID for the 2.4 GHz network may be "MYHOME" or "MYHOME_2 G" (the base substring in this example being "MYHOME"). Additionally, in many instances, the same password and security type may be utilized for both networks.

As such, in examples described herein, a client computing device may utilize these patterns to automatically select an appropriate wireless network of a second frequency band (e.g., 2.4 GHz) for a target computing device when the client computing device is connected to a related wireless network of a first frequency band (5 GHz).

For example, in examples described herein, a client computing device may determine that the client computing device is connected to a first wireless network of a first frequency band to which a target computing device cannot connect, the first wireless network having a first service set identifier (SSID). The computing device may further identify at least one other wireless network currently in range of at least one of the client and target computing devices, and, without user intervention, select for use by the target computing device, a second wireless network identified as currently in range, that operates in a second frequency band, and that has a second SSID that includes at least a base substring of the first SSID of the first wireless network, wherein the target computing device is able to connect to wireless networks of the second frequency band. The client computing device may further instruct the target computing device to connect to the selected second wireless network.

In this manner, examples described herein may enable a wireless setup application of a client computing device to automatically select a wireless network of an appropriate frequency band for a target computing device when the client computing device is connected to a wireless network of a different frequency band to which the target computing device cannot connect.

Figure 1:
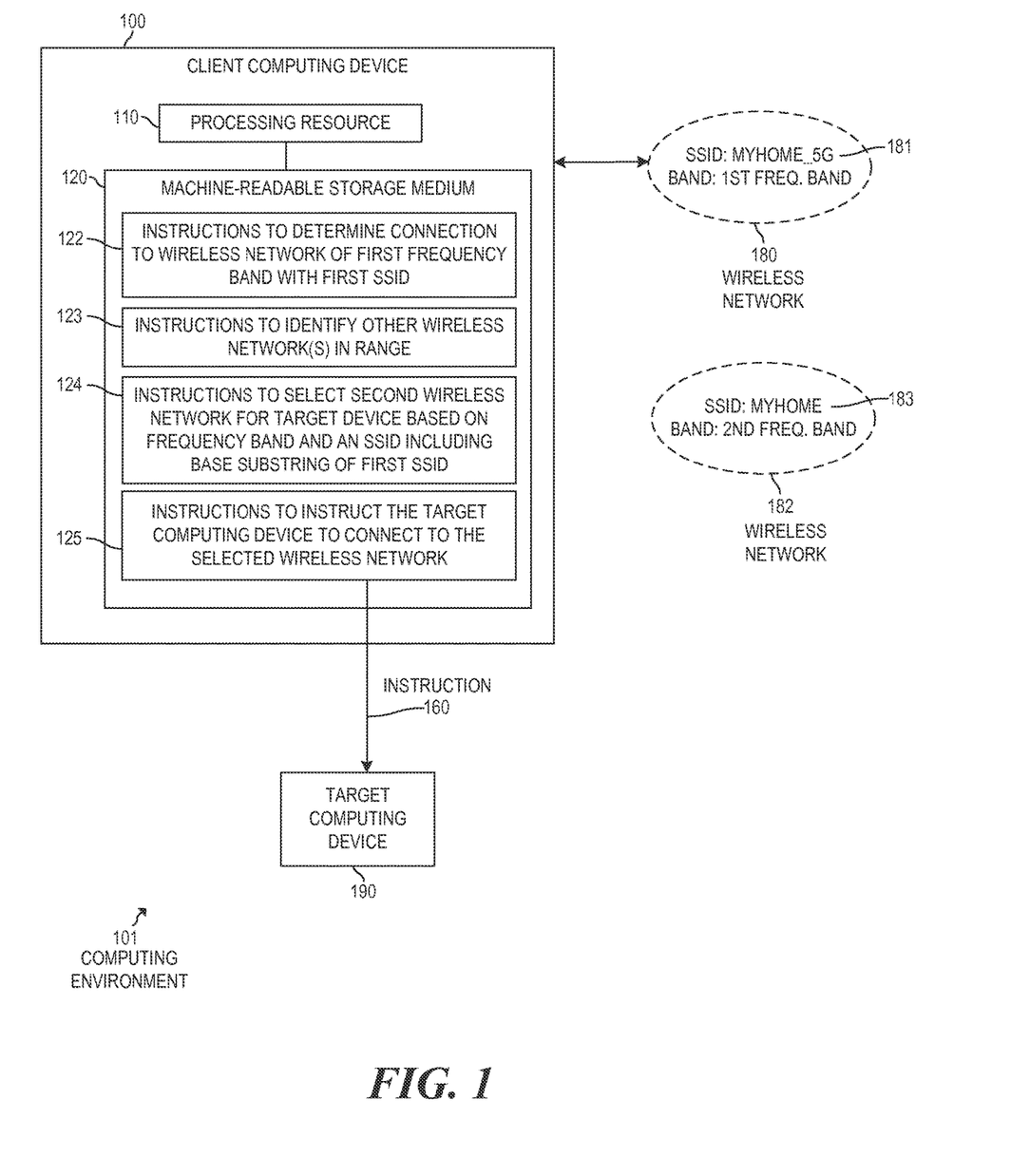
FIG. 1 is a block diagram of an example computing environment including a client computing device to select a wireless network for use by a target computing device.

Referring now to the drawings, FIG. 1 is a block diagram of an example computing environment 101 including a client computing device 100 to select a wireless network for use by a target computing device 190. As used herein, a "computing device" may be a desktop computer, notebook computer, workstation, tablet computer, mobile phone, smart device, printing device, server, blade enclosure, or any other processing device or equipment.

In the example of FIG. 1, client computing device 100 includes a processing resource 110 and a machine-readable storage medium 120 encoded with instructions 122-125 executable by processing resource 110 to perform the functionalities described below. In some examples, storage medium 120 may include additional instructions. In some examples, instructions 122-125, and any other instructions described herein in relation to storage medium 120, may be stored on a machine-readable storage medium remote from but accessible to computing device 100 and processing resource 110 (e.g., via a computer network), In examples described herein, a processing resource may include, for example, one processor or multiple processors included in a single computing device or distributed across multiple computing devices.

Figure 2:
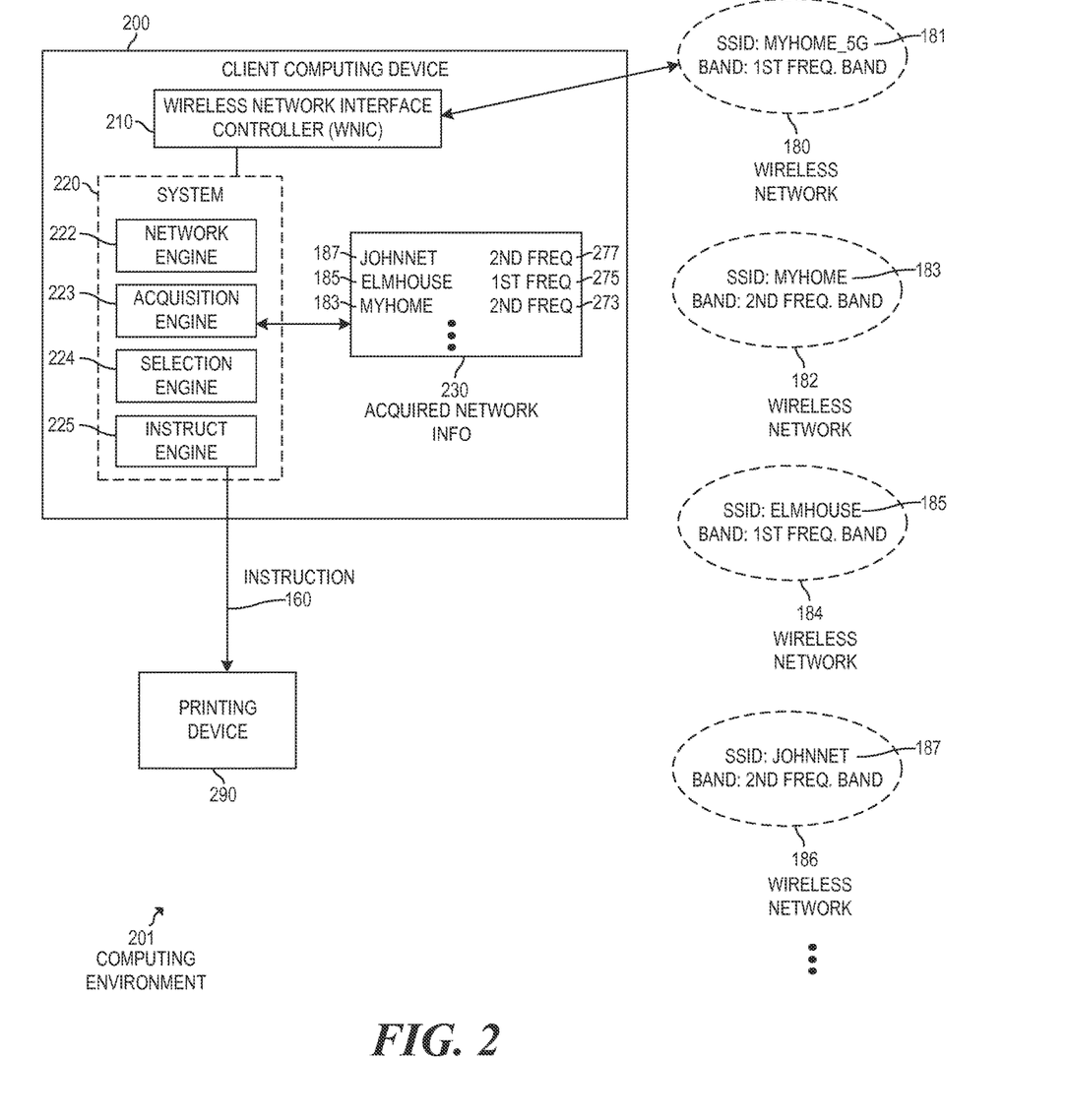
FIG. 2 is a block diagram of an example computing environment including a client computing device to instruct a target computing device to connect to a wireless network selected by the client computing device.

In the example of FIG. 1, client computing device 100 may also include a network interface controller (e.g., a wireless network interface controller, such as WNIC 210 illustrated in FIG. 2). In examples described herein, a "network interface controller" (or "NIC") may be a hardware device to communicate over at least one computer network, and "wireless network interface controller" (or "WNIC") may be a hardware device to communicate over at least one wireless network. In examples described herein, a wireless network may be a wireless local area network (WLAN). As used herein, a computer network may include, for example, local area network(s) (LAN(s)), WLAN(s), virtual private network(s) (VPN(s)), the Internet, telephone network(s) (e.g., cellular telephone network(s)), or the like, or a combination thereof. In the example of FIG. 1, target computing device 190 may include a WNIC. In some examples, target computing device 190 may be a printing device including a WNIC to connect to wireless networks.

In the example of FIG. 1, instructions 122 may determine that client computing device 100 is connected to a wireless network 180 of a first frequency band to which 190 target computing device cannot connect, the wireless network 180 having a first service set identifier (SSID) 181 (e.g., "MYHOME_5 G" in the example of FIG. 1). For example, instructions 122 may obtain, from the operating system (OS) of client computing device 100, information associated with the wireless network 180 to which client computing device 100 is connected. Such information may include, for example, at least one of the SSID 181 of wireless network 180, identification of the frequency band in which wireless network 180 operates, a basic service set identification (BSSID) of wireless network 180, a password to connect to wireless network 180, a security type utilized by wireless network 180 (e.g., wired equivalent privacy (WEP), WPA, WPA2, etc.), and the like, or a combination thereof.

In the example of FIG. 1, wireless network 180 has an SSID 181 of "MYHOME_5 G", and operates in a first frequency band, which, in the example of FIG. 1, may be the 5 GHz frequency band. In examples described herein, a wireless network that operates in a given frequency band (e.g., 5 GHz) may be referred to as a wireless network "of" the given frequency band.

In the example of FIG. 1, identify at least one other wireless network currently in range of at least one of the client computing device 100 and the target computing device 190. In some examples, instructions 123 may identify the other wireless networks in range by obtaining, from the OS of client computing device 100, information associated with each wireless network detected by client computing device 100 as being in range of client computing device 100. The information obtained may include, for each detected wireless network, at least one of the SSID of the wireless network, the frequency band of the wireless network, the BSSID of wireless network, and the like, or a combination thereof.

In some examples, instructions 123 may identify the other wireless networks in range by obtaining, from target computing device 190, information associated with each wireless network detected by target computing device 190 as being in range of target computing device 190 (which, in some examples, may be a printing device). The information obtained may include, for each detected wireless network, at least one of the SSID, frequency band, and BSSID of the wireless network, and the like, or a combination thereof. In such examples, instructions 123 may provide a request to target computing device 190 requesting identification of wireless networks in range to the target computing device 190, and target computing device 190 may provide the information associated with the wireless networks in range to client computing device 100 in response to the request. In such examples, client computing device 100 and target computing device 190 may communicate wirelessly, such as via their respective wireless network interface controllers in accordance with at least one 802.11 specification. In some examples, instructions 123 may identify the other wireless networks currently in range based on wireless network information obtained from the OS of client computing device 100, as described above, and based on wireless network information obtained from target computing device 190, as described above.

In the example of FIG. 1, target computing device 190 is not able to connect to wireless networks of the first frequency band, but is able to connect to wireless networks of a second frequency band different than the first frequency band. In such examples, instructions 124 may, without user intervention, select for use by the target computing device, another wireless network 182 that was identified as currently in range, that operates in a second frequency band, and that has an SSID 183 that includes at least a base substring of SSID 181 of wireless network 180. In such examples, instructions 125 may instruct target computing device 190 to connect to the selected wireless network 182. In some examples, the first frequency band may be a 5 GHz frequency band, and the second frequency band may be a 2.4 GHz frequency band.

In examples described herein, an SSID may be a string of character(s). In some examples, instructions 124 may determine a base substring of SSD 181 of wireless network 180 based on whether SSID 181 Includes a predefined SSID modifier. In such examples, instructions 124 may determine whether SSID 181 includes a predefined SSID modifier. In such examples, instructions 124 may define a plurality of predefined SSID modifiers. In some examples, the predefined SSID modifiers may be based upon common SSID modifiers utilized in standard setup processes for wireless routers that provide wireless networks in multiple frequency bands (e.g., 2.4 GHz and 5 GHz). Such modifiers may include (e.g., begin with) a delimiter, such as a dash ("-"), underscore ("_"), star ("*"), or, other character, which may be followed by one or more additional characters, which in some examples may indicate a frequency band (e.g., "5", "5 G", or "5 g" for a 5 GHz network).

For example, the predefined SSID modifiers may include at least one of "_5", "-5", "_5 G", "_5 g", "-5 G", "-5 g", and the like (associated with a 5 GHz network). The predefined SSID modifiers may also include at least one of "_2", "-2", "_24", "-24", "_2 G", "_2 g", "-2 G", "-2 g", and the like (associated with a 2.4 GHz network). In some examples, instructions 124 may define the predefined SSID with a stored list of the predefined SSID modifiers. In other examples, instructions 124 may define predefined SSID modifiers by one or more patterns that predefined SSID modifiers may adhere to, such as, for example, a 2-4 character suffix beginning with a predefined delimiter followed by the number 5. In other examples, other suitable patterns may be used. In other examples, the predefined SSID modifiers may be defined in any other suitable manner. Also, while example SSID modifiers and patterns are described above, other modifiers or patterns may be used. In examples described herein, a "base substring" of an SSID is a non-empty substring of an SSID excluding any predefined SSID modifier when the SSID includes a predefined modifier, and is the full SSID when the SSID includes none of the predefined SSID modifiers.

In the example of FIG. 1, instructions 124 may determine whether SSID 181 includes any predefined SSID modifier (e.g., a modifier stored in a list, or a modifier matching a predefined pattern, as described above). In some examples, a predefined SSID modifier may be a prefix or a suffix of an SSID. In other examples, a predefined SSID modifier may be located elsewhere within an SSID.

In response to a determination that first SSID 181 includes a given predefined SSID modifier, instructions 124 may determine that the base substring of SSID 181 is the substring of first SSID 181 excluding the Oven predefined SSID modifier. For example, in the example of FIG. 1 SSID 181 is "MYHOME_5 G", and instructions 124 may determine that SSID 181 includes predefined SSID modifier "5 G", and determine that the base substring of SSIs 181 is "MYHOME" (e.g., SSID 181 excluding the SSID modifier "_5 G").

In such examples, instructions 124 may, without user intervention, select for use by target computing device 190, wireless network 182 that was identified as currently in range, that operates in the second frequency band (e.g., 2.4 GHz), and that has an SSID 183 that includes the base substring of SSID 181. In the example of FIG. 1, instructions 124 select, without user intervention, wireless network 182 since SSID 183 ("MYHOME") of wireless network 182 includes the base substring ("MYHOME") of first SSID 181 ("MYHOME_5 G"), and operates in the second frequency band. In some examples described her)in, wireless networks 181 and 182 may be bridged (or pass through enabled) wireless networks provided by the same wireless router (or WAP).

In other examples, the SSID 183 may include the base substring ("MYHOME") of the SSID 182 and an SSID modifier, such as a predefined SSID modifier associated with the second frequency band (e.g., "_2 G"). In such examples, instructions 124 may select, without user intervention, a wireless network 182 in range that operates in the second frequency band and that has a SSID 183 ("MYHOME_2 G") that includes the base substring ("MYHOME") of SSID 181 ("MYHOME_5 G"), In other examples, in response to a determination that SSID 181 does no include a predefined SSID modifier, instructions 124 may determine that the base substring of SSID 181 is the full SSID 181. For example, if SSID 181 were "NETWORK", instructions 124 may determine the SSID 181 does not include a predefined SSID modifier and determine that the base substring of SSID 181 is "NETWORK" (i.e., the full SSID 181). In such examples, instructions 124 may, without user intervention, select for use by target computing device 190, the currently in range wireless network 182 that operates in the second frequency band (e.g., 2.4 GHz) and that has the SSID ("NETWORK") that includes the base substring ("NETWORK") of SSID 181.

In such examples, instructions 124 may, without user intervention, select for use by target computing device 109, another wireless network that was identified as currently in range, that operates in the second frequency band, and that has the same SSID as the first wireless network.

In some examples described herein, the functionalities described above in relation to instructions 122-124 may all occur without user intervention, such that client computing device 100 may select a second wireless network of the second frequency band while the client computing device is connected to a first wireless network of the first frequency band, and based on the SSD of the first wireless network, automatically and without interaction from the user. In this manner, examples described herein may make it easier for users to connect a target computing device (such as a printing device) to a wireless network when wireless networks of multiple different frequency bands are available. Such automated selection by the client computing device 100 of the appropriate wireless network for the target computing device 190 may avoid errors that may occur when a user attempts to connect the target computing device to an inappropriate wireless network. For example, a user may not be aware that a printing device can only connect to a 2.4 GHz frequency band network, and in the presence of 2.4 GHz and 5 GHz wireless networks with the same SSID, the user may select the wrong one and encounter difficulties. As such, the automated selection of the appropriate wireless network by the client computing device may make the connection process much simpler for users in such cases.

In some examples, instructions 125 may further be performed without user intervention. For example, once instructions 124 have selected the second wireless network for use by the target computing device 190 instructions 125 may obtain other credentials for target computing device 190 to use to connect to the selected wireless network. For example, as described above, standard setup procedures for wireless routers providing multiple wireless networks of different frequency bands may give the networks the same or similar SSIDs, and may give them the same password and security type. As such, in some examples, instructions 125 may provide target computing device 190 an instruction 160 to connect to the second wireless network of the second frequency hand, using credentials (e.g., SSID, password, and security type) provided by client computing device 100. For example, the password and security type may be the password and security type of the first wireless network 180 obtained by instructions 122 from the OS of client computing device 100, as described above. In such examples, client computing device 100 may select second wireless network and instruct 160 target computing device 190 to connect to the second wireless network with the appropriate credentials, all without user intervention.

In other examples, after instructions 124 select the wireless network 182 for use by target computing device 190, instructions 125 may prompt a user of client computing device 100 to enter additional credentials to use for connecting to the selected wireless network, such as at least one of a password, security type, or the like, for the selected wireless network, which instructions 125 may provide to target computing device 190 with instruction 160 to instruct target computing device 190 to connected to the selected wireless network.

In some examples, instructions 124 may use other information to select an appropriate wireless network, such as the BSSID of wireless network 180, and the BSSIDs of other wireless network(s) identified as in range by instructions 123.

For example, when instructions 124 identify multiple wireless networks in range that operate in the second frequency band and include at least the base substring of the first SSID 181, instructions 124 may additionally compare BSSID information for the wireless networks to determine which to select. In some examples, from an initial group of multiple wireless networks identified by instructions 124 based on frequency band and SSID, instructions 124 may select a wireless network having a BSSID that is similar to the BSSID associated with wireless network 180. In some examples, BSSIDs may be formatted as a set of six blocks (e.g., separated by colons), each block made up of a two-digit hexadecimal number. An example BSSID for wireless network 180 may be "2d:75:8a:f0:24:94", for example. In such examples, instructions 124 may select, from the multiple identified wireless networks, another wireless network whose BSSID matches the first five blocks (i.e., the left most or most significant five blocks) of wireless network 180 and has a difference in the last block of 32 or less. For example, in an example in which wireless network 182 was one of the multiple identified networks and has a BSSID of "2d:75:8a:f0:24:95", instructions 124 may select wireless network 182, based on the first five blocks of its BSSID matching the first five blocks of the BSSID of wireless network 180 and there being a difference of one in the last block. In examples in which there are multiple networks with such BSSID matches, instructions 124 may select the BSSID that has the least difference in the last block (i.e., the network with the closest matching BSSID). In other examples, instructions 124 may determine the similarity of BSSIDs in any other suitable manner. Such similarities in BSSIDs may indicate that the networks may be related and share credentials (e.g., password, security type) that may be provided to target computing device 190 as described above, In other examples, instructions 124 may utilize BSSIDs in the same way when none of the wireless network(s) of the second frequency band that are in range includes at least a base substring of first SSID 181. In such examples, the BSSIDs may be used to select one of the in-range wireless networks of the second frequency band, as described above for the case of multiple SSID matches. In other examples, instructions 124 may utilize BSSIDs in any other suitable manner in the selection of a wireless network.

In other examples, instructions 124 may select no wireless network when either none or multiple of the wireless networks of the second frequency band in range have SSIDs that include the base substring of SSID 181. In such examples, instructions 124 may prompt a user of client computing device 100 to select one of the other wireless network(s) identified as being in range.

While examples have been described herein in the context of a first frequency band of 5 GHz and a second frequency band of 2.4 GHz, other combinations of frequency bands may be used. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may include one processor or multiple processors. Processing resource 110 may fetch, decode, and execute instructions stored on storage medium 120 to perform the functionalities described above in relation to instructions 122-125. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media is part of an article (or article of manufacture). An article or article of manufacture may refer to any manufactured single component or multiple components. The storage medium may be located either in the computing device executing the machine-readable instructions, or remote from but accessible to the computing device (e.g., via a computer network) for execution.

In some examples, instructions 122-125 may be part of an installation package that, when installed, may be executed by processing resource 110 to implement the functionalities described herein in relation to instructions 122-125. In such examples, storage medium 120 may be a portable medium, such as a CD, DVD, or flash drive, or a memory maintained by a server from which the installation package can be downloaded and installed. In other examples, instructions 122-125 may be part of an application, applications, or component already installed on client computing device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-4.

FIG. 2 is a block diagram of an example computing environment 201 including a client computing device 200 to instruct a target computing device to connect to a wireless network selected by client computing device 200. In the example of FIG. 2, computing environment 201 comprises a client computing device 200, a target computing device (a printing device 290 in the example of FIG. 2), and a plurality of wireless networks, including at least wireless networks 180, 182, 184, and 186. In the example of FIG. 2, client computing device 200 comprises a wireless network interface controller (WNIC) 210 and a system 220 including engines 222-225. While in the example of FIG. 2, the target computing device 290 is illustrated as a printing device 290, in other examples the target computing device 290 may be any other type of computing device.

In the example of FIG. 2, network engine 222 may determine that client computing device 200 is connected to a wireless network 180 of a first frequency band and having a service set identifier (SSID) 181 ("MYHOME_5 G" in the example of FIG. 2), as described above in relation to FIG. 1. In the example of FIG. 2, the target computing device 290 (e.g., printing device 290) cannot connect to wireless networks of the first frequency band (e.g., 5 GHz).

Acquisition engine 223 may acquire an SSID and frequency band identification for each of at least one wireless network identified as currently in range to at least one of client computing device 200 and target computing device 290. In some examples, engine 223 may acquire, from the OS of client computing device 200, an SSID and frequency band identification for each of at least one wireless network identified, by client computing device 200, as currently in range to client computing device 200, as described above in relation to client computing device 100 of FIG. 1.

In other examples, engine 223 may acquire, from target computing device 290, an SSID and frequency band identification for each of at least one wireless network identified, by target computing device 290, as currently in range to target computing device 290, as described above in relation to computing devices 100 and 190 of FIG. 1. In such examples, client computing device 200 and target computing device 290 may communicate wirelessly, such as via their respective wireless network interface controllers in accordance with at least one 802.11 specification. As noted above, in some examples, the target computing device 290 may be a printing device 290. In such examples, engine 223 may acquire, from printing device 290, an SSID and frequency band identification for each of at least one wireless network identified, by printing device 290, as currently in range to printing device 290.

In other examples, engine 223 may identify the other wireless networks currently in range based on wireless network information obtained from the OS of client computing device 200, as described above, and based on wireless network information obtained from target computing device 190, as described above.

In the example of FIG. 2, engine 223 may acquire at least network information 230 associated with wireless networks 182, 184, and 186, identified as being in range of at least one of client computing device 200 and target computing device 290. In the example of FIG. 2, network information 230 includes a least the SSIDs and frequency band information for each identified wireless network. For example, network information 230 includes, for wireless network 182, an SSID 183 ("MYHOME") and an indication 273 that the network operates in the second frequency band. For wireless network 184, network information 230 includes an SSID 185 ("ELMHOUSE") and an indication 275 that the network operates in the first frequency band. For wireless network 186, network information 230 includes an SSID 187 ("JOHNNET") and an indication 277 that the network operates in the second frequency band. In some examples, the acquired network information 230 may include information from more or fewer wireless networks.

In the example of FIG. 2, target computing device 290 is able to connect to wireless networks of the second frequency band (e.g., a 2.4 GHz frequency band). In such examples, selection engine 224 may, without user intervention, select for use by target computing device 290, a wireless network identified as currently in range, that operates in a second frequency band, and that has an SSID that includes at least a base substring of the SSID 181 of wireless network 180 to which client computing device 200 is connected.

In the example of FIG. 2, engine 224 may determine a base substring of SSID 181 of wireless network 180 based on predefined SSID modifiers, as described above in relation to FIG. 1. In the example of FIG. 2, engine 224 may determine that the base substring of SSID 181 ("MY-HOME_5 G") is "MYHOME". In such examples, engine 223 may, without user intervention, select for use by target computing device 290, a wireless network identified in network information 230 as currently in range, that operates in a second frequency band, and that has an SSID that includes the base substring ("MYHOME") of SSID 181. In such examples, engine 224 may parse, search, or otherwise evaluate, in any suitable manner, the acquired network information for a wireless network that operates in the second frequency band and that has an SSID including the base substring of SSID 181. In the example of FIG. 2, engine 224 may select wireless network 182, which operates in the second frequency band and has an SSID 183 ("MYHOME") that includes the base substring ("MYHOME") of SSID 181. In some examples described herein, wireless networks 181 and 182 may be bridged (or pass through enabled) wireless networks provided by the same wireless router (or WAP).

In the example of FIG. 2, instruct engine 225 may instruct target computing device 290 to connect to the selected wireless network 182 using credentials provided by client computing device 200. In some examples, the provided credentials may include at least one of the password for wireless network 181 and the network security type used by wireless network 181. In some examples, engine 225 may provide at least one of the password and security type of wireless network 180 obtained by engine 223 from the OS of client computing device 200 (and as described above in relation to computing device 100 of FIG. 1). In such examples, client computing device 200 may select wireless network 182 and instruct 160 target computing device 290 to connect to wireless network 182 with the appropriate credentials, all without user intervention. In other examples, engine 225 may prompt a user for credentials (e.g., password, security type) for the selected wireless network 182, which engine 225 may receive and provide to target computing device 290 with or in association with an instruction 160 to target computing device 290 to connect to the selected wireless network 182 using the provided credentials.

In some examples, selection engine 224 may select no wireless network for target computing device 290 when either none or multiple of the wireless network(s) of the second frequency band identified as in range have an SSID that includes the base substring of SSID 181. In such examples engine 225 may prompt a user of client computing device 200 to manually select a wireless network to connect target computing device 290 to. In other examples, when either none or multiple of the wireless network(s) of the second frequency band identified as in range have an SSID that includes the base substring of SSID 181, engine 224 may select the second wireless network based in part on the BSSID associated with wireless network 180 and the respective BSSIDs associated with the wireless networks identified as being in range, as described above in relation to FIG. 1.

Each of engines 222-225 of system 220 may be any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 222-225. In such examples, system 220 may include the machine-readable storage medium storing the instructions and the processing resource to execute the instructions, or the machine-readable storage medium may be separate but accessible to system 220 and the processing resource.

In some examples, the instructions can be part of an installation package that, when installed, can be executed by the processing resource to implement at least engines 222-

225. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on system 220 including the processing resource. In such examples, the machine-readable storage medium may include memory such as a hard drive, solid state drive, or the like. in other examples, the functionalities of any engines of system 220 may be implemented in the form of electronic circuitry.

While examples have been described herein in the context of a first frequency band of 5 GHz and a second frequency band of 2.4 GHz, other combinations of frequency bands may be used. In some examples, functionalities described herein in relation to FIG. 2 may be provided in combination with functionalities described herein in relation to any of FIGS. 1, 3, and 4.

Figure 3:
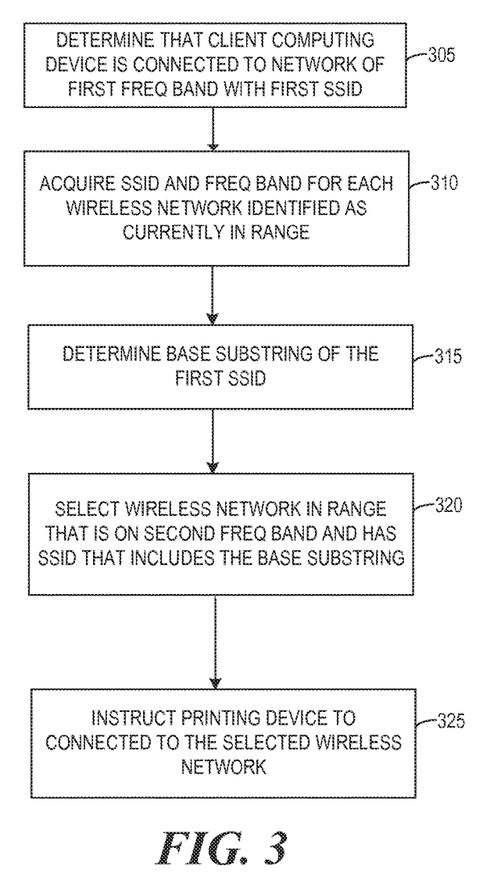
FIG. 3 is a flowchart of an example method for selecting a wireless network use by a printing device.

FIG. 3 is a flowchart of an example method 300 for selecting a wireless network for use by a printing device. Although execution of method 300 is described below with reference to client computing device 100 of FIG. 1 described above, other suitable computing devices (e.g., computing device 200) for the execution of method 300 can be utilized. Additionally, implementation of method 300 is not limited to such examples.

At 305 of method 300, instructions 122 of client computing device 100 may determine that the client computing device 100 is connected to a wireless network 180 of a first frequency band having an SSID 181 (e.g., "MYHOME_5 G"), as described above in relation to FIG. 1. In some examples, instructions 122 may receive user input selecting a printing device or other target computing device to connect to a wireless network using client computing device 100. In some examples, the selected printing device (or another selected target computing device) cannot connect to wireless network 180 of the first frequency band (e.g., 5 GHz), but is able to connect to wireless networks of a different, second frequency band (e.g., 2.4 GHz).

At 310, instructions 123 may acquire an SSID and frequency band identification for each of at least one wireless network identified as currently in range to at least one of the client computing device 100 and the printing device, as described above in relation to FIG. 1.

At 315, instructions 124 may determine a base substring of SSID 181, as described above. At 320, instructions 124 may, without user intervention, select for use by the printing device, another wireless network 182 that was identified as currently in range, that operates in a second frequency band, and that has an SSID 183 (e.g., "MYHOME") that includes at least the base substring (e.g., "MYHOME") of SSID 181 (e.g., "MYHOME_5 G") of wireless network 180. At 325, instructions 125 may instruct the printing device to connect to the selected wireless network 182, as described above.

Although the example described herein in relation to FIG. 3, was described in relation to a printing device, method 300 may also be performed for any other target computing device in other examples, Also, although the example described herein in relation to FIG. 3, was described in relation to first and second frequency bands of 5 GHz and 2.4 GHz, in other examples the frequency bands may be any other suitable combination of different frequency bands. Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1, 2, and 4.

Figure 4:
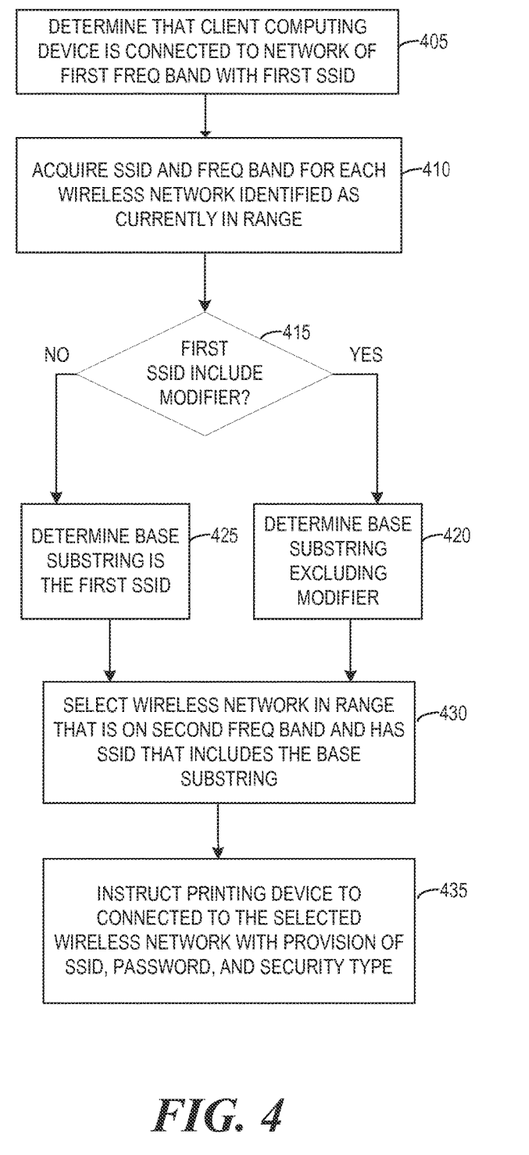
FIG. 4 is a flowchart of an example method for using a base substring of a service set identifier (SSID) to select a wireless network for use by a printing device.

FIG. 4 is a flowchart of an example method 400 for using a base substring of a service set identifier (SSID) to select a wireless network for use by a printing device. Although execution of method 400 is described below with reference to client computing device 100 of FIG. 1 described above, other suitable computing devices (e.g., computing device 200) for the execution of method 400 can be utilized. Additionally, implementation of method 400 is not limited to such examples.

At 405 of method 400, instructions 122 of client computing device 100 may determine that the client computing device 100 is connected to a wireless network 180 of a first frequency band having an SSID 181 (e.g., "MYHOME_5 G"), as described above in relation to FIG. 1. In some examples, instructions 122 may receive user input selecting a printing device or other target computing device to connect to a wireless network using client computing device 100. In some examples, the selected printing device (or another selected target computing device) cannot connect to wireless network 180 of the first frequency band (e.g., 5 GHz), but is able to connect to wireless networks of a different, second frequency band (e.g., 2.4 GHz).

At 410, instructions 123 may acquire an SSID and frequency band identification for each of at least one wireless network identified as currently in range to at least one of the client computing device 100 and the printing device, as described above in relation to FIG. 1.

At 415, instructions 124 may determine whether the SSID 181 includes a predefined SSID modifier, as described above. In response to a determination that SSID 181 includes a given predefined SSID modifier, then at 420, instructions 124 may determine that the base substring of SSID 181 is the substring of SSID 181 excluding the given predefined SSID modifier, as described above. In response to a determination that SSID does not include a predefined SSID modifier, then at 425, instructions 124 may determine that the base substring of SSID 181 is the full SSID 181, as described above.

At 430, instructions 124 may, without user intervention, select for use by the printing device, another wireless network 182 that was identified as currently in range, that operates in a second frequency band, and that has an SSD 183 (e.g., "MYHOME") that includes at least the base substring (e.g., "MYHOME") of SSID 181 (e.g., "MYHOME_5 G") of wireless network 180. At 435, instructions 125 may instruct the printing device to connect to the selected wireless network 182, as described above, including providing, to the printing device, the SSID 183 of the selected wireless network 182, a password for wireless network 181, and a security type.

Although the example described herein in relation to FIG. 4, was described in relation to a printing device, method 400 may also be performed for any other target computing device in other examples. Also, although the example described herein in relation to FIG. 4, was described in relation to first and second frequency bands of 5 GHz and 2.4 GHz, in other examples the frequency bands may be any other suitable combination of different frequency bands. Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3.

What is claimed is:

1. A non-transitory machine-readable storage medium comprising instructions that when executed by a processing resource of a client computing device cause the processing resource to:
   determine that the client computing device is connected to a first wireless network of a first frequency band to which a target computing device, connected to the client computing device, cannot connect, the first wireless network having a first service set identifier (SSID);
   identify other wireless networks currently in range of at least one of the client and target computing devices;
   based on the other wireless networks identified as currently in range, select for use by the target computing device, a second wireless network that operates in a second frequency band and has a second SSID that includes at least a base substring of the first SSID of the first wireless network, wherein the target computing device is able to connect to wireless networks of the second frequency band; and
   instruct the target computing device to connect to the selected second wireless network.

2. The storage medium of claim 1, wherein the instructions to cause the processing resource to select comprise instructions to cause the processing resource to:
   without user intervention, select for use by the target computing device, the second wireless network that operates in the second frequency band, and that has the same SSID as the first wireless network.

3. The storage medium of claim 1, wherein the instructions to cause the processing resource to select comprise instructions to cause the processing resource to:
   determine the base substring of the first SSID of the first wireless network;
   without user intervention, select for use by the target computing device, the second wireless network that operates in the second frequency band, and that has the second SSID that includes the determined base substring of the first SSID.

4. The storage medium of claim 3, wherein the instructions to cause the processing resource to determine the base substring comprise instructions to cause the processing resource to:
   determine whether the first SSID of the first wireless network includes a predefined SSID modifier;
   in response to a determination that the first SSID includes the predefined SSID modifier, determine that the base substring of the first SSID is a substring of the first SSID excluding the predefined SSID modifier; and
   in response to a determination that the first SSID does not include the predefined SSID modifier, determine that the base substring of the first SSID is the full first SSID.

5. The storage medium of claim 3, wherein the second SSID includes the base substring of the first SSID and an SSID modifier.

6. The storage medium of claim 1, wherein the target computing device is a printing device.

7. The storage medium of claim 1, wherein the first frequency band is a 5 GHz frequency band and the second frequency band is a 2.4 GHz frequency band.

8. The storage medium of claim 1, wherein to identify the other wireless networks currently in range of at least one of the client and target computing devices, the instructions are to cause the processing resource to:
   identify wireless networks currently in range of the client computing device; and
   obtain, from the target computing device, information of wireless networks currently in range of the target computing device.

* * * * *